(12) United States Patent
Leman

(10) Patent No.: US 9,387,600 B1
(45) Date of Patent: *Jul. 12, 2016

(54) METHOD OF PREPARING A MOLD TO FORM AN ARTICLE AND METHOD OF FORMING THE ARTICLE WITH THE MOLD

(71) Applicant: General Electric Company, Schenectady, NY (US)

(72) Inventor: John Thomas Leman, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,690

(22) Filed: Dec. 11, 2014

Related U.S. Application Data

(63) Continuation-in-part of application No. 13/731,394, filed on Dec. 31, 2012.

(51) Int. Cl.
| | | |
|---|---|---|
| *B28B 7/36* | (2006.01) | |
| *B28B 7/34* | (2006.01) | |
| *B28B 7/38* | (2006.01) | |
| *B28B 7/28* | (2006.01) | |
| *B28B 1/24* | (2006.01) | |

(52) U.S. Cl.
CPC ... *B28B 7/36* (2013.01); *B28B 1/24* (2013.01); *B28B 7/28* (2013.01); *B28B 7/348* (2013.01); *B28B 7/386* (2013.01)

(58) Field of Classification Search
CPC ........ B29C 33/56; B29C 33/05; B29C 33/60; B29C 33/62; B29C 33/64; B29C 33/72; B29C 33/722; B29C 47/0877; B29C 47/0883; B29C 45/1753; B29C 45/24; B29C 33/58; B08B 9/00; B08B 9/027; F28G 9/00; B22C 3/00; B22C 1/14; B28B 7/384; C09D 183/04; C23C 14/12; C23C 14/24; C23C 14/22; C23C 14/223; C23C 14/56; B22D 11/07; B22D 13/102; B22D 13/104
USPC ............... 264/39, 85; 134/22.1, 22.14, 22.19; 425/DIG. 116; 427/133, 134, 135; 164/33; 106/38.22, 38.23, 38.24
See application file for complete search history.

(56) References Cited

U.S. PATENT DOCUMENTS

| | | | |
|---|---|---|---|
| 5,740,051 A * | 4/1998 | Sanders et al. ................. | 700/119 |
| 7,287,573 B2 | 10/2007 | McNulty et al. | |
| 7,487,819 B2 | 2/2009 | Wang et al. | |
| 7,732,526 B2 | 6/2010 | McNulty et al. | |
| 2002/0012754 A1 * | 1/2002 | Yamamura et al. ........... | 427/487 |
| 2008/0135722 A1 | 6/2008 | Wang et al. | |
| 2011/0217544 A1 * | 9/2011 | Young et al. .................. | 428/327 |
| 2011/0250363 A1 * | 10/2011 | Komatsubara et al. ....... | 427/475 |

* cited by examiner

*Primary Examiner* — James Sanders
*Assistant Examiner* — Leith S Shafi
(74) *Attorney, Agent, or Firm* — John P. Darling

(57) ABSTRACT

A method of preparing a mold to form an article is provided. In one embodiment, the method includes preparing a quantity of fluid including lightweight oil, submerging the mold in the quantity of fluid such that the fluid at least partially enters internal cavities of the mold, and filling asperities defined in walls of the mold. The filling includes creating a negative pressure in the mold while submerged in the quantity of fluid, and removing substantially all air from the internal cavities.

20 Claims, 4 Drawing Sheets

METHOD OF PREPARING A MOLD TO FORM AN ARTICLE AND METHOD OF FORMING THE ARTICLE WITH THE MOLD

CROSS-REFERENCE TO RELATED APPLICATIONS

This application is a continuation-in-part and claims priority to U.S. patent application Ser. No. 13/731,394 filed on Dec. 31, 2012 for "METHOD OF PREPARING A MOLD TO FORM AN ARTICLE AND METHOD OF FORMING THE ARTICLE WITH THE MOLD", which is hereby incorporated by reference in its entirety.

BACKGROUND

The field of the present disclosure relates generally to treating porous articles and, more specifically, to preparing disposable core dies to form a ceramic article.

At least some known turbine components, such as blades, nozzles, and vanes, have complex geometries. For example, turbine blades and nozzles may have internal passages and/or voids defined therein that must be manufactured in accordance with accurate dimensions having tight tolerances. In such instances, investment casting is generally effective at manufacturing parts that require dimensional accuracy and precision.

When manufacturing turbine components as described herein, investment casting may involve forming a disposable core die (DCD) by any suitable method. A low-viscosity, silica-based ceramic slurry is typically poured or injected into the DCD, and the slurry is cured such that the cured ceramic slurry conforms to the internal shape of the DCD. The cured ceramic core is then fired to produce a solidified ceramic core, the core is positioned within a shell mold, and the turbine component is formed such that the core defines the internal passages and/or voids of the turbine component when the core is removed from the shell mold.

One method of forming a DCD is in a rapid prototyping process. Rapid prototyping involves forming an object, based on a digital model, by layering material with a 3D printing machine. While rapid prototyping is effective at creating dimensionally accurate objects, the process generally uses auxiliary material to support the object being built. For example, solid objects formed with a 3D printing machine may include a wax-like auxiliary substance on the outer surface of the object, and hollow objects may also include the wax-like auxiliary substance within internal cavities of the object. For hollow objects such as a DCD, the auxiliary material may block the passage of slurry therethrough resulting in a ceramic core having incomplete structures.

One method of removing the auxiliary material from the object is to heat the wax-like substance such that it melts and drips off the object. While this method is effective in removing auxiliary material from the outer surface of objects, heating the wax-like substance may not effectively remove all the auxiliary material from internal cavities of hollow objects, especially when the internal cavities have a small and intricate design and/or dead-end passages. Thermal removal may be combined with solvent cleaning to clear excess material from internal cavities of a hollow DCD. While solvent cleaning clears the internal cavities of auxiliary material, a solvent such as hexane generally dissolves at least a portion of the material that the DCD is constructed from. As such, open pores may be formed in the previously impermeable walls of the DCD, which may alter the shape of and result in surface roughness on the formed DCD core. Accordingly, when the ceramic slurry is injected into the DCD and solidified, the DCD core formed therefrom will fall outside of acceptable dimensional tolerances because the slurry conforms to the altered DCD shape.

BRIEF DESCRIPTION

In one aspect, a method of preparing a mold to form an article is provided. The method includes preparing a quantity of fluid including lightweight oil, submerging the mold in the quantity of fluid such that the fluid at least partially enters internal cavities of the mold, and filling asperities defined in walls of the mold. The filling includes creating a negative pressure in the mold while submerged in the quantity of fluid, and removing substantially all air from the internal cavities.

In another aspect, a method of forming an article with a mold is provided. The method includes constructing the mold from a first material, cleaning internal cavities of the mold with a solvent that at least partially dissolves the first material, filling asperities defined in walls of the mold with a quantity of fluid that includes lightweight oil, wherein the asperities are formed during cleaning with the solvent. The method also includes injecting a second material into the mold, wherein the article is formed from the second material.

DETAILED DESCRIPTION

Figure 1:
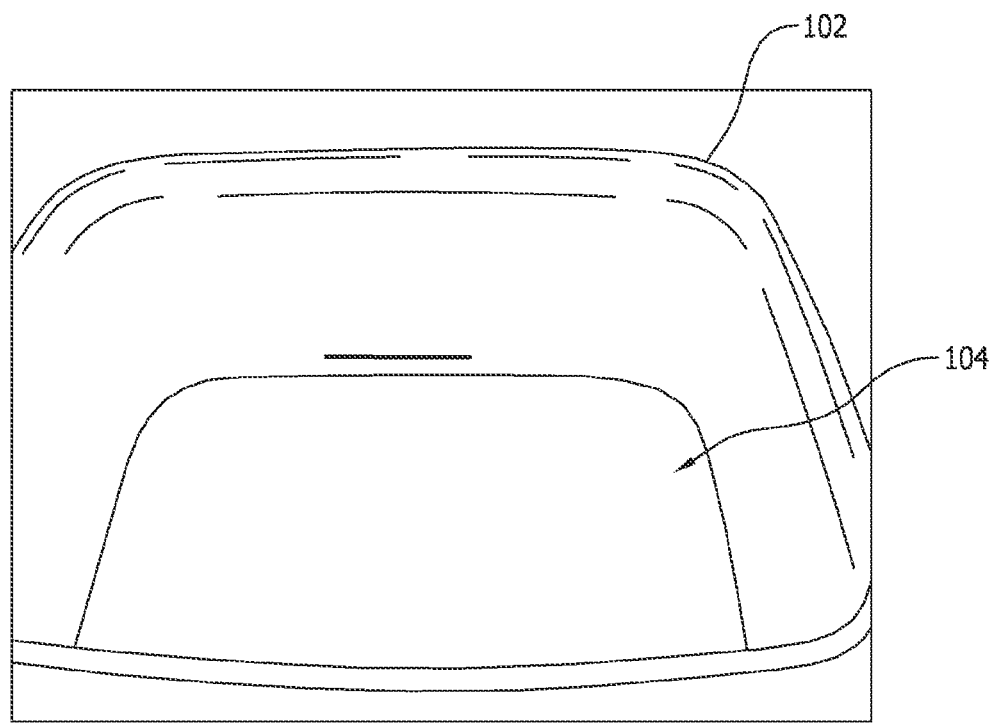
FIG. 1 is a perspective view of an exemplary container with a quantity of fluid therein.

Embodiments of the present disclosure enable forming a ceramic core in a disposable core die (DCD) with improved dimensional accuracy. More specifically, embodiments of the present disclosure facilitate forming smooth ceramic cores by filling porous die walls with oil. In the exemplary embodiments, a fixtured rack of DCDs are formed in a rapid prototyping process that uses an auxiliary material to support the DCDs during formation. To remove the auxiliary material from the DCDs, a thermal removal and solvent cleaning process is used. The thermal removal facilitates removing a large portion of the auxiliary material from the DCD, and solvent cleaning is used to dissolve auxiliary material that is not easily removed from internal cavities of the DCD with thermal removal. In one embodiment, the DCDs are constructed of a material that also partially dissolves during solvent cleaning resulting in porous DCD walls. In the exemplary embodiment, the auxiliary material is a wax-like material, and the DCD material is an organic thermosetting polymer.

Injection molding using a DCD that has porous die walls may result in the liquid component of the slurry being absorbed into the walls, which increases solids loading in the slurry, increases the slurry viscosity, and may result in non-fill regions within the DCD. To facilitate preventing these modes of injection failure and to facilitate preventing a ceramic core from conforming to the shape of the porous walls, in one embodiment the DCDs are treated with a lightweight oil to fill the die wall porosity. In the exemplary embodiments, a solution is formed that includes mineral oil diluted in hexane solvent. The DCDs are submerged in the oil-solvent solution such that the internal cavities of the DCDs receive the solution therein. Because a DCD generally has an intricate structure with passageways as small as about 10-20 mils in diameter, the solution may not easily enter such passageways. Accordingly, in the exemplary embodiments, the DCDs are placed in a vacuum chamber while submerged in the solution to remove substantially all of the air from the internal cavities. As used herein, the term "internal cavities" may refer to internal passageways formed during DCD construction and/or pores defined in the DCD walls formed during solvent cleaning.

It is believed, without being bound by any particular theory, that submerging the DCDs in solution facilitates filling the pores in the DCD walls with the lightweight oil. The lightweight oil used herein doesn't react with the ceramic slurry, remains in liquid form and does not dry on the walls of the DCD, and any excess oil that remains on the DCD walls is forced towards the DCD outlet as slurry is injected therethrough. Accordingly, the lightweight oil substantially blocks the ceramic slurry from entering the pores to facilitate forming smooth ceramic DCD cores that conform to the CAD master design used to form the DCD.

Methods of preparing a mold to form an article, and methods of forming the article with the mold are described herein. For example, the methods described herein may include at least one of: a) constructing a DCD (mold) from an organic polymer; b) heating the DCD in a thermal removal process to remove auxiliary material from the DCD; c) cleaning internal cavities of the DCD with a solvent that at least partially dissolves the DCD material; d) using compressed air, at about 1.0 bar, to check for additional auxiliary material blockage in the DCD; e) preparing a solution that includes lightweight oil and liquid hydrocarbon solvent at a weight ratio of about 53:47; f) submerging the DCD in the solution such that the solution at least partially enters internal cavities of the DCD; g) creating a negative pressure in the DCD while submerged in the solution to facilitate removing substantially all of the air from the internal cavities and porous DCD walls; h) releasing the negative pressure in the DCD; i) creating the negative pressure and releasing the negative pressure until substantially all of the air is removed from the internal cavities; j) removing the DCD from the solution; k) removing excess solution by drying the DCD with compressed air blown therethrough at about 1.0 bar; l) drying the DCD in a vacuum chamber at a pressure below the vapor pressure of the solvent; m) injecting the ceramic slurry into the DCD; and n) curing the ceramic slurry to form a solidified ceramic core.

Figure 2:
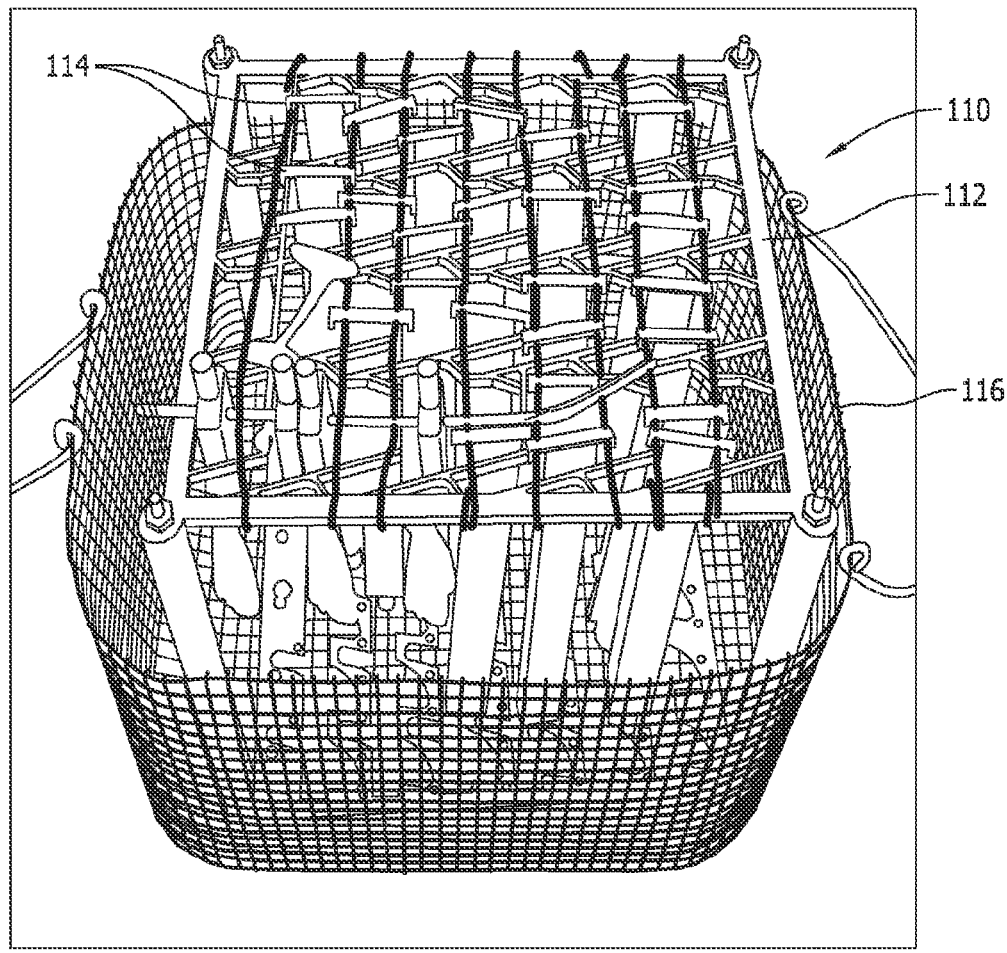
FIG. 2 is a perspective view of an exemplary oiling assembly for use in the container as shown in FIG. 1.

FIG. 1 is a perspective view of a container 102 with a quantity of fluid 104 therein, and FIG. 2 is a perspective view of an oiling assembly 110 for use in container 102. In the exemplary embodiment, oiling assembly 110 includes a fixture 112 of DCDs 114, and an oiling basket 116. Fixture 112 may be formed by any suitable means, such as a rapid 3D prototyping process. Once DCDs 114 have been formed and cleaned with thermal removal and solvent cleaning processes, DCDs 114 may be prepared, in an oiling process, to receive ceramic slurry therein. In the exemplary embodiment, fixture 112 is placed in basket 116 that is sized to be received within container 102. Container 102 has any suitable quantity of fluid 104 that enables the process to function as described herein. In the exemplary embodiment, container 102 has a quantity of fluid 104 that fills container 102 up to any suitable height that enables fixture 112 to be completely submerged therein.

In the exemplary embodiments, the fluid is prepared by diluting lightweight oil in a quantity of liquid hydrocarbon solvent forming an oil-solvent solution. The solution may include any suitable lightweight oil that enables the solution to function as described herein. As used herein, the term "lightweight oil" refers to an oil that has a viscosity of less than about 200 centipoise. Further, preferably the oil is non-reactive with the ceramic slurry, remains in liquid form and does not dry on the walls of DCD 114, and may be discharged from DCD 114 when present in excess quantities. An example of suitable lightweight oil includes, but is not limited to, mineral oil. Further, the solution may include any suitable solvent that enables the solution to function as described herein. An example of a suitable solvent includes, but is not limited to, hexane. In an alternative embodiment, fluid 104 is a lightweight oil, such as silicone oil, undiluted in solvent and having a comparable viscosity to the above described mineral oil-hexane solution. The lightweight oil may be used in place of the mineral oil-hexane solution.

In some embodiments, the weight ratio of lightweight oil to solvent may vary based on the specific DCD material composition. The lightweight oil and solvent concentrations may be determined based on the amount of die wall open porosity to be filled, the DCD material used, and how much DCD material was dissolved during solvent cleaning. For example, in any of the various embodiments of the present disclosure where lightweight oil is diluted in solvent, the lightweight oil concentration is at least about 25 percent, at least about 30 percent, at least about 40 percent, at least about 50 percent, at least about 60 percent, at least about 75 percent, or within a range defined between about 25 percent and about 75 percent by weight based on the weight of the solution. In some embodiments, the lightweight oil concentration is about 53 percent by weight based on the weight of the solution. Further, in any of the various embodiments of the present disclosure where lightweight oil is diluted in solvent, the solvent concentration is at least about 25 percent, at least about 30 percent, at least about 40 percent, at least about 50 percent, at least about 60 percent, at least about 75 percent, or within a range defined between about 25 percent and about 75 percent by weight based on the weight of the solution. In some embodiments, the solvent concentration is about 47 percent by weight based on the weight of the solution.

In any of the various embodiments of the present disclosure, the mineral oil, the mineral oil-hexane solution, and the silicone oil may have any suitable viscosity that enables the process to function as described herein. For example, in some embodiments, the mineral oil has a viscosity of about 147 centipoise, the mineral oil-hexane solution having an oil concentration of about 53 percent by weight and a hexane concentration of about 47 by weight has a viscosity of about 2 centipoise, and the silicone oil has a viscosity of about 5 centipoise.

Figure 3:
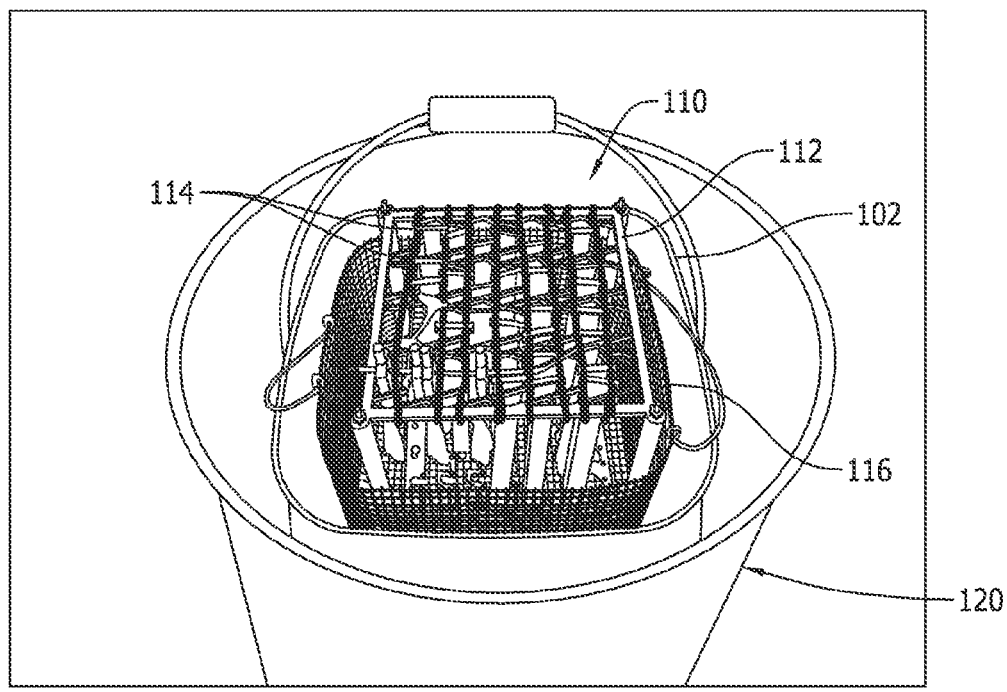
FIG. 3 is a perspective view of an exemplary vacuum chamber.

FIG. 3 is a perspective view of a vacuum chamber 120 used to create a negative pressure within DCDs 114. In the exemplary embodiment, basket 116 is moved into position within container 102 such that DCDs 114 are submerged in the quantity of fluid 104. Fluid 104 enters internal cavities of DCDs 114, and DCDs 114 remain submerged therein for a period of time to facilitate filling asperities in the porous DCD walls formed during the solvent cleaning process. While fluid 104 enters some of the DCD internal cavities at atmospheric pressure, DCD 114 has an intricate structure with passageways as small as about 10-20 mils in diameter. Accordingly, in the exemplary embodiment, container 102, fluid 104, fixture 112, and basket 116 are positioned within vacuum chamber 120 to facilitate drawing fluid 104 into DCDs 114, and to facilitate removing all or substantially all of the air that remains within DCDs 114.

In the exemplary embodiment, vacuum chamber 120 is sealed and a negative pressure is created therein. Vacuum chamber 120 may reduce the pressure therein to any suitable pressure that enables the process to function as described herein. For example, in some embodiments, the negative pressure within vacuum chamber 120 is maintained above the vapor pressure of the liquid hydrocarbon solvent used such that some portion of the solvent always remains in its liquid phase. In the exemplary embodiment, the vapor pressure of hexane is about 0.2 bar, and the pressure within vacuum chamber 120 is maintained at about 0.5 bar.

In some embodiments, the oiling process includes maintaining the negative pressure within vacuum chamber 120 for a period of time to ensure the internal cavities of DCDs 114 are completely filled with fluid 104. In any of the various embodiments of the present disclosure, the negative pressure may be maintained for any suitable period of time that enables the process to function as described herein. Non-limiting examples of suitable periods of time include greater than about 1 second, greater than about 5 seconds, greater than about 10 seconds, greater than about 30 seconds, greater than about 1 minute, greater than about 5 minutes, or within a range defined between about 1 second and about 5 minutes. In some embodiments, the negative pressure is held for about 30 seconds. Further, in some embodiments, the negative pressure is released and the negative pressure is reapplied to facilitate removing the air from within DCDs 114. Creating the negative pressure and releasing the negative pressure may be repeated any suitable number of times that facilitates removing air from within DCDs 114.

Once the air has been removed from DCDs 114, the process includes soaking fixture 112 in fluid 104 at atmospheric pressure for a period of time. In any of the various embodiments of the present disclosure, the period of time may be greater than about 5 minutes, greater than about 15 minutes, greater than about 30 minutes, greater than about 45 minutes, greater than about 60 minutes, greater than about 75 minutes, greater than about 90 minutes, or within a range defined between about 5 minutes and about 90 minutes. In one embodiment, fixture 112 soaks in fluid 104 for a period of about 60 minutes. It is believed, without being bound by any particular theory, that allowing fixture 112 to soak in fluid 104 facilitates enabling the lightweight oil to uptake into the open porosity of the DCD walls and remain therein.

Fixture 112 is then removed from fluid 104 and excess solution is allowed to drain from the internal cavities of DCDs and drip back into container 102. DCDs 114 are then dried by blowing compressed air therethrough to facilitate removing excess solution therefrom, while the lightweight oil remains within the DCD walls. To further dry DCDs 114, fixture 112 may be positioned within vacuum chamber 120 without being submerged in fluid 104. Vacuum chamber 120 is then depressurized to a pressure below the vapor pressure of the liquid hydrocarbon solvent used. In some embodiments, vacuum chamber 120 is depressurized to a full vacuum such that any remaining solvent vaporizes and is removed from the internal cavities of DCDs 114.

Figure 4:
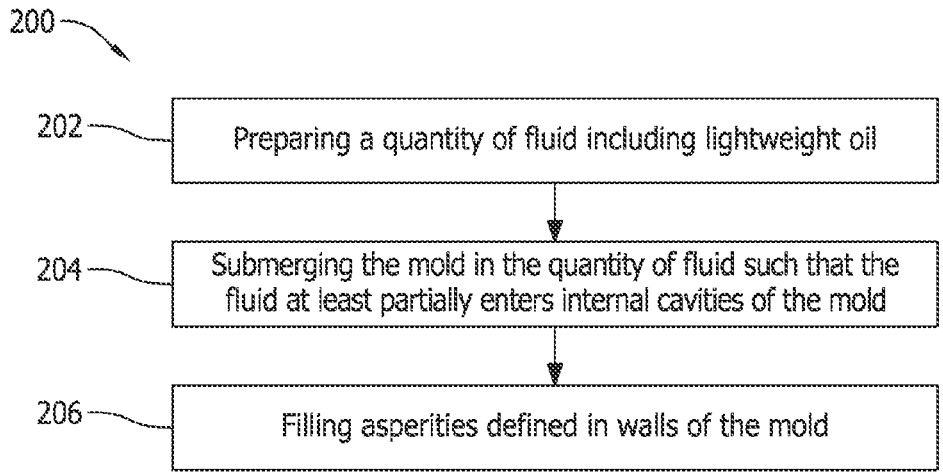
FIG. 4 is a flow diagram of an exemplary method of preparing a mold to form an article.
Figure 5:
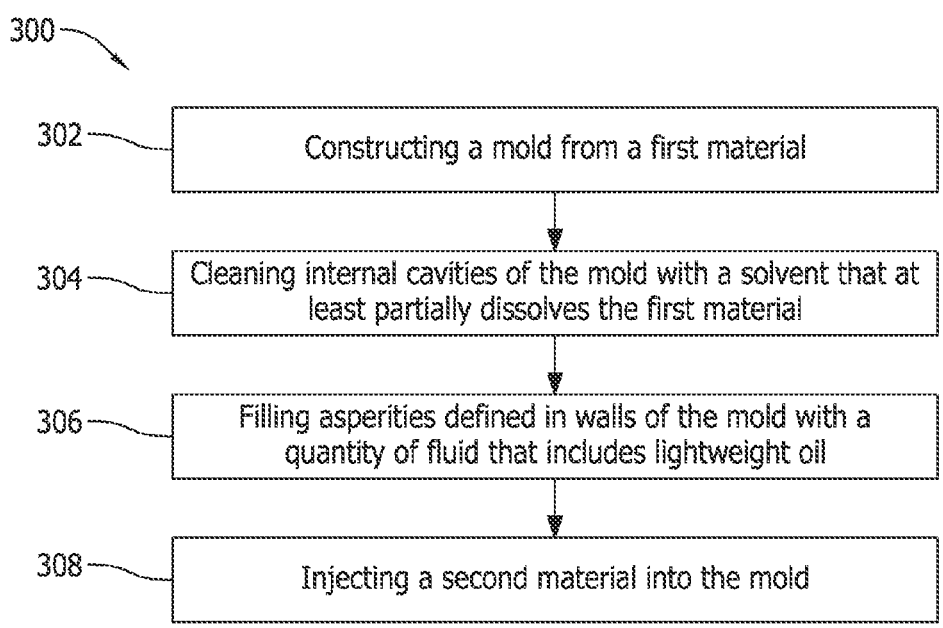
FIG. 5 is a flow diagram of an exemplary method of forming an article with a mold.

FIG. 4 is a flow diagram of a method 200 of preparing a mold to form an article, and FIG. 5 is a flow diagram of a method 300 of forming an article with a mold. In the exemplary embodiment, method 200 includes preparing 202 a quantity of fluid 104 including lightweight oil, submerging 204 DCDs 114 in the quantity of fluid 104 such that the solution enters internal cavities of DCDs 114, and filling 206 asperities defined in walls of DCDs 114.

Referring to FIG. 5, method 300 of forming a ceramic core (not shown) within DCDs 114 is also described herein. In the exemplary embodiment, method 300 includes constructing 302 DCD 114 from a first material, cleaning 304 internal cavities of DCD 114 with a solvent that at least partially dissolves the first material, and filling 306 asperities defined in walls of DCD 114 with a quantity of solution that includes lightweight oil. Once the oiling process has been completed, the method includes injecting 308 a second material into DCD 114 such that the second material conforms to the shape of DCD 114. In the exemplary embodiment, the second material is ceramic slurry, and the ceramic slurry is injected into DCD 114 after oiling DCD 114 to fill the asperities formed therein. It is believed that because the lightweight oil remains in liquid form and does not dry on the walls of DCD 114, excess oil that is not absorbed into the porous walls may gravity drain from DCD 114. It is also believed that because the lightweight oil remains in liquid form, any excess lightweight oil that remains within DCDs 114 and is not located in the porous walls will be forced towards the outlet of the DCDs 114 and will be discharged therethrough during slurry injection. As such, the lightweight oil does not adversely affect the ceramic slurry from being injected into DCDs 114 and taking the form thereof.

EXAMPLES

The following non-limiting simulations are provided to further illustrate the present disclosure.

Sheets of VisiJet® ("VisiJet" is a registered trademark of 3D Systems, Inc. of Valencia, Calif.) HR200 having a thickness of either 16 mils (0.41 mm) or 40 mils (1.02 mm) were constructed and cleaned with a hexane solvent to facilitate creating open porosity within the samples. Eight samples of 16 mil sheets and eight samples of 40 mil sheets were formed and cleaned with the hexane solvent. The sheets were subjected to two hexane solvent cleaning cycles for about 1 hour per cycle at about 40° C.

The open porosity percentage of the sheets was determined by using Archimedean buoyancy measurements in accordance with ASTM C830. The open porosity results are presented in Table 1 below. The samples having a 16 mil thickness had an average open porosity of 6.6 percent based on the total volume of the samples, and the samples having a 40 mil thickness had an average open porosity of 4.6 percent based on the total volume of the samples.

TABLE 1

| Sample Thickness | 16 mil | 40 mil |
| --- | --- | --- |
| Average Open Porosity % (% total volume of sample) | 6.6% | 4.6% |

Accordingly, it has been found that the thicker samples lost less material, in the form of solubles, when cleaned with hexane. As such, the 16 mil samples had a higher average open porosity percentage than the 40 mil samples by about 2 percent.

The eight samples of 16 mil thick sheets, and the eight samples of 40 mil thick sheets were solvent cleaned as described above and treated using the oiling process as described by embodiments of the present disclosure. A solution was prepared by diluting a quantity of mineral oil in hexane. More specifically, a first composition having 20 percent mineral oil and 80 percent hexane by weight was prepared, a second composition having 30 percent mineral oil and 70 percent hexane by weight was prepared, a third composition having 40 percent mineral oil and 60 percent hexane by weight was prepared, and a fourth composition having 50 percent mineral oil and 50 percent hexane by weight was prepared. Two samples of each respective thickness were submerged in one of the four compositions and allowed to soak for one hour. The samples were soaked, under vacuum, removed from the composition, and dried under vacuum as described above.

The porosity saturation percentage was determined by first calculating the open porosity percentage of the solvent-cleaned samples as described above. The samples were then re-weighed after being treated with lightweight oil, and dried to remove the hexane solvent such that only the lightweight oil remained. The post-treatment weight was compared to the pre-treatment weight of each sample to determine the mass of lightweight oil uptaken therein, and the density of the pure oil component remaining therein after hexane removal was also measured. The oil density was then used to determine the volume of lightweight oil that impregnated the samples, based upon direct measurement of the oil mass uptake, and the determined lightweight oil volume was compared to the known open porosity volume.

The oiling process results are presented in Table 2 below. The 16 mil samples submerged in the first composition resulted in a 66 percent saturation of the open porosity, and the 40 mil samples submerged in the first composition resulted in a 51 percent saturation of the open porosity. The 16 mil samples submerged in the second composition resulted in a 110 percent saturation of the open porosity, and the 40 mil samples submerged in the second composition resulted in a 94 percent saturation of the open porosity. The 16 mil samples submerged in the third composition resulted in a 169 percent saturation of the open porosity, and the 40 mil samples submerged in the third composition resulted in a 139 percent saturation of the open porosity. The 16 mil samples submerged in the fourth composition resulted in a 173 percent saturation of the open porosity, and the 40 mil samples submerged in the fourth composition resulted in a 176 percent saturation of the open porosity.

TABLE 2

| Sample Thickness | 16 mil | 40 mil |
| --- | --- | --- |
| % Oil by Weight | % Open Porosity Saturation | |
| 50 | 173 | 176 |
| 40 | 169 | 139 |
| 30 | 110 | 94 |
| 20 | 66 | 51 |

Accordingly, compositions having higher percentages of lightweight oil by weight more effectively saturated the open porosity of the disposable core die walls. Further, it was found that loading of 30 percent oil by weight resulted in at least 100 percent open porosity saturation for the 16 mil samples, and loading of 40 percent oil by weight resulted in at least 100 percent open porosity saturation for the 40 mil samples. It is believed that saturation of greater than 100 percent does not adversely affect the ceramic core forming process because the excess lightweight oil will be removed from the DCD during ceramic slurry injection.

Greater than 100 percent saturation is achieved from solution infiltration into the samples open pores at a microscopic level and into the DCD polymer's free volume at the molecular level. As such, apparent open pore volume saturation of greater than 100 percent is possible such that the porous walls remain substantially saturated with lightweight oil after solvent removal with the vacuum drying process described above. For example, when a sample's porosity is initially filled with a solution having 50% lightweight oil by volume and 50% solvent by volume, vacuum drying the sample evaporates the solvent and theoretically reduces the open porosity saturation to about half of the original open porosity percentage. As such, it is believed that the oil uptake into the bulk DCD polymer at the molecular level facilitates reducing a likelihood of oil depletion during the drying steps. Accordingly, variables such as the percentage of oil by weight in the solution, the sample's open pore volume, the observed oil uptake by mass, the open porosity saturation percentage, and the theoretical open porosity percentage after solvent removal are interrelated. Such variables can be measured or calculated by one skilled in the art and are taken into account when targeting an oil-solvent concentration to effectively fill open porosity for a given DCD material.

As shown by the experimental results, hexane solvent cleaning results in open porosity within materials constructed from an organic polymer, and the oiling process described herein facilitates substantially filling the die wall open porosity resulting from the solvent cleaning process. As such, the oiling process counteracts the effects of solvent cleaning on DCDs such that a rapid 3D prototyping process may be used to create readily injectable DCDs that facilitate forming dimensionally accurate molded parts.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming an article with a mold constructed of a first material, said method comprising:
    cleaning internal cavities of the mold with a solvent that at least partially dissolves the first material;
    filling asperities defined in walls of the mold with a fluid that includes lightweight, oil, the asperities formed during cleaning with the solvent, and
    injecting a second material into the mold, wherein the article is formed from the second material, wherein the filling asperities further comprises:
    submerging the mold in the fluid including lightweight oil such that the fluid at least partially enters internal cavities of the mold;
    creating a negative pressure in the mold while submerged in the fluid; and
    removing substantially all air from the internal cavities.

2. The method in accordance with claim 1, wherein injecting the second material comprises injecting the second material after filling the asperities with the fluid.

3. The method in accordance with claim 1 further comprising removing excess fluid from the mold with compressed air.

4. The method in accordance with claim 1, wherein injecting a second material comprises injecting a ceramic slurry into the mold, wherein the article is formed from the ceramic slurry.

5. The method in accordance with claim 4 further comprising curing the ceramic slurry to form a solidified ceramic article.

6. The method in accordance with claim 1, wherein the first material comprises an organic polymer.

7. A method of forming an article with a mold constructed of a first material, said method comprising:
  cleaning internal cavities of the mold with a solvent that at least partially dissolves the first material;
  filling asperities defined in walls of the mold with a fluid that includes lightweight oil, the asperities formed during cleaning with the solvent; and
  injecting a second material into the mold, wherein the article is formed from the second material, wherein filling asperities further comprises:
  submerging the mold in the fluid including lightweight oil such that the fluid at least partially enters internal cavities of the mold;
  creating a negative pressure in the mold while submerged in the fluid; and
  removing substantially all air from the internal cavities.

8. The method in accordance with claim 7, wherein the fluid comprises a solution that includes the lightweight oil and a solvent.

9. The method in accordance with claim 8, wherein the lightweight oil is at least about 25 percent by weight of the solution.

10. The method in accordance with claim 7, wherein creating the negative pressure comprises maintaining the negative pressure above the vapor pressure of the solvent.

11. The method in accordance with claim 8, further comprising:
  removing the mold from the solution; and
  drying the mold in a vacuum chamber at a pressure below the vapor pressure of the solvent.

12. The method in accordance with claim 7, further comprising:
  releasing the negative pressure; and
  repeating creating the negative pressure and releasing the negative pressure until substantially all of the air is removed from the internal cavities.

13. The method in accordance with claim 8, wherein the solvent is a liquid hydrocarbon.

14. The method in accordance with claim 13, wherein the solvent is hexane.

15. The method in accordance with claim 8, wherein the solvent is at least about 25 percent by weight based on the weight of the solution.

16. The method in accordance with claim 8, wherein the lightweight oil is about 53 percent by weight of the solution and the solvent is about 47 percent by weight of the solution.

17. The method in accordance with claim 7, wherein the lightweight oil is mineral oil.

18. The method in accordance with claim 7, wherein the lightweight oil is silicone oil.

19. The method in accordance with claim 8, wherein the lightweight oil is between about 25 to about 75 percent by weight of the solution and the solvent is between about 25 to about 75 percent by weight of the solution.

20. The method in accordance with claim 7, further comprising soaking the mold in the fluid at atmospheric pressure for at least about 5 minutes.

* * * * *